Figure 1:
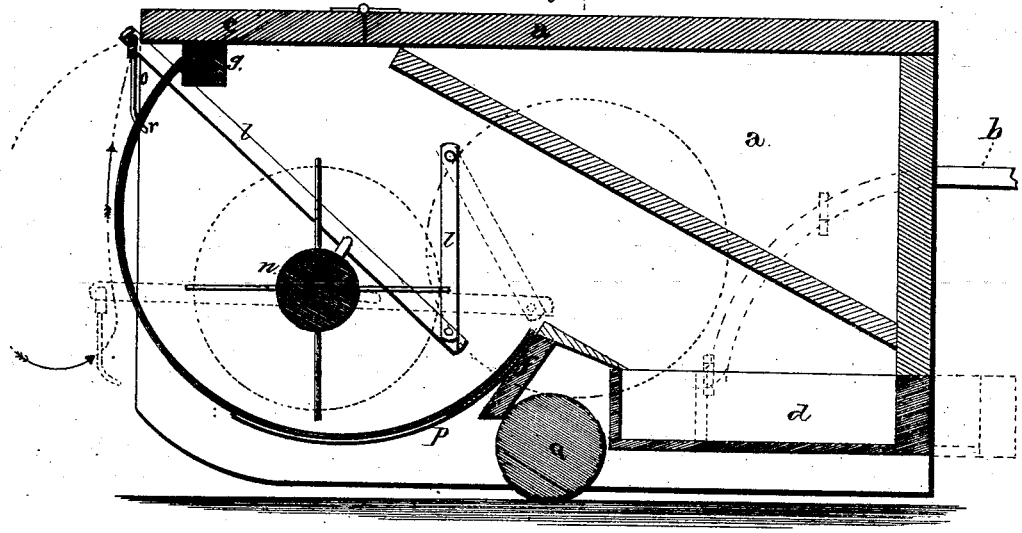
Figures 3, 4:
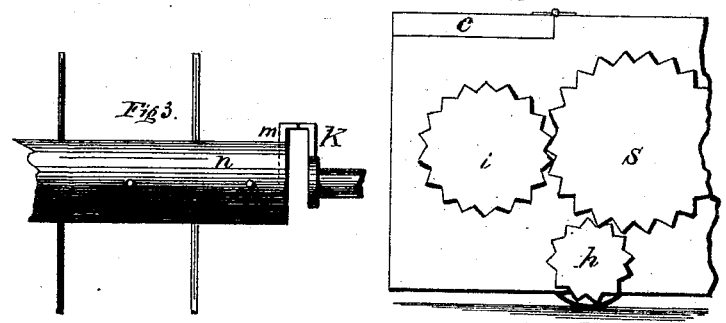
Figure 2:
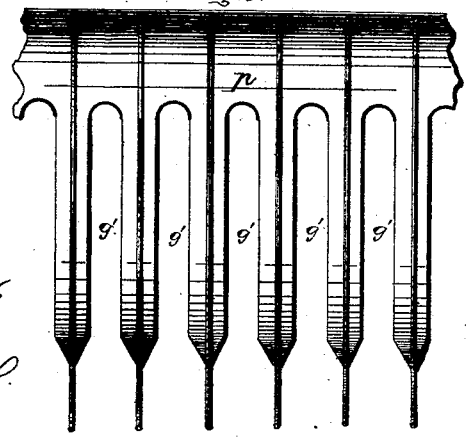

W. CROWELL.
Cranberry-Pickers.

No. 157,158. Patented Nov. 24, 1874.

WITNESSES.
J. W. Larner,
T. F. Lehmann

INVENTOR:
Wm. Crowell
per
F. A. Lehmann
Att'y

UNITED STATES PATENT OFFICE.

WILLIAM CROWELL, OF DENNIS, MASSACHUSETTS.

IMPROVEMENT IN CRANBERRY-PICKERS.

Specification forming part of Letters Patent No. 157,158, dated November 24, 1874; application filed September 26, 1874.

*To all whom it may concern:*

Be it known that I, WILLIAM CROWELL, of Dennis, in the county of Barnstable and State of Massachusetts, have invented certain new and useful Improvements in Cranberry-Pickers; and I do hereby declare the following to be a full, clear, and exact description of the invention, such as will enable others skilled in the art to which it pertains to make and use it, reference being had to the accompanying drawings, which form part of this specification.

My invention relates to an improvement in cranberry-pickers; and it consists in a closed frame or box, having suitable wires and strippers in its front end, and having a roller journaled in its bottom, upon which the frame moves, and which communicates motion, through suitable gears, to a revolving brush and a rake, as will be more fully described hereafter.

The accompanying drawing represents my invention.

$a$ is an inclosed oblong frame or box of suitable dimensions, having the rear half of its bottom closed and the forward half open, and has handles $b$ attached to its sides, which extend backward, so as to enable the operator to push the machine in front of him. The top of this box is closed, and has a hinged door or trap, $c$, opening the front end over the pan $p$. The hind part of this box is also closed, but has a drawer, $d$, at its lower end, which slides upon the closed part of the bottom. A roller, $q$, is journaled under the center of the frame, and extends down below sufficiently far to serve as a support for the box, and thus becomes the motor of the machine when pushed forward. Forward of this roller is the pan $p$, which consists of a number of wires, equidistant, and bent in a circular form, extending from the cross-piece $f$ down, forward, and up to another brace, $g$, over the pan, where they are fastened. Under and attached to the inner ends of the wires, and forming the pan, is a plate of metal, into which slits $g'$ are cut, corresponding to the number of wires, and wide enough for the vines to enter, when the berries on the vines, being too large to slip through the openings, will be stripped and left in the pan. On one or both ends of the roller $q$ is a pinion, $h$, which gears with an idle-wheel, $s$, journaled to the side of the frame or box $a$, which wheel meshes with wheel $i$, having its bearing on the side of the box. The wheels $s\ i$ and pinion $h$ are countersunk into the side of the box, to be flush with its surface, to prevent vines, &c., from catching, and thereby impede their motion. To the journal of the wheel $i$, inside the box, is a crank, $k$, on which the compound lever $l$ has its fulcrum; and joined to this crank is another one, $m$, which turns the shaft of the brush $n$. On the forward ends of the compound lever $l$, and in front of the pan $p$, is the rake $o$, its teeth $r$ being slightly bent at their ends. The head of the rake is pivoted between the outer ends of the lever $l$, and has its backward motion checked by a shoulder formed upon the inner side of each one of the levers, which hold the rake pressed forward in its upper movement, so as to catch the bushes and force them between the wires.

It operates as follows: The box, bearing upon the roller, is pushed forward by the handles, and the train of wheels set in motion by the revolving roller. The crank on the journal of the wheel $i$ pushes, elevates, draws back, and depresses the forward ends of the lever, and carries the rake along its varied motions, whereby the vines are pressed between the wires of the pan, and stripped of their berries by means of the metal plates. The berries are forced over the back part of the pan, and drop into the drawer behind, which drawer may be drawn out from behind and emptied. The brush $n$, by its revolving motion, sweeps the berries out of the pan into the drawer.

Having thus described my invention, I claim—

1. A cranberry-picker provided with the movable rake $o$, operated by the forward motion of the machine, substantially as shown, for the purpose of pressing the bushes between the wires.

2. The combination of the compound lever $l$, rake $o$, crank $k$, connecting-wheels, and roller $q$, substantially as specified.

3. The combination of the rake $o$, levers $l$, brush $n$, cranks $m\ k$, pan $p$, stripping devices $g'$, and roller $q$, substantially as described.

In testimony that I claim the foregoing I have hereunto set my hand and seal this 22d day of September, 1874.

WILLIAM CROWELL. [L. S.]

Witnesses:
    J. C. HOWCK,
    LUTHER HALL.